United States Patent [19]
Harrison

[11] 3,796,292
[45] Mar. 12, 1974

[54] STEERING SYSTEM
[75] Inventor: Robert R. Harrison, Elyria, Ohio
[73] Assignee: Nemo Corporation, Cleveland, Ohio
[22] Filed: Apr. 13, 1972
[21] Appl. No.: 243,652

[52] U.S. Cl................ 192/8 C, 74/240, 74/501 R, 74/480 B, 74/496, 114/144 R, 254/95
[51] Int. Cl....... F16c 1/10, B63h 25/52, F16d 51/00
[58] Field of Search........... 192/8 C; 74/501 R, 240, 74/245 R, 480 B, 496; 254/95, DIG. 6; 114/144 R

[56] References Cited
UNITED STATES PATENTS

| 2,446,415 | 8/1948 | Flurscheim et al. | 74/501 X |
| 2,475,527 | 7/1949 | Stilwell | 74/501 X |
| 3,184,991 | 5/1965 | Bomberger | 192/8 C X |
| 1,870,244 | 8/1932 | Elston | 254/95 |
| 2,321,702 | 6/1943 | Renkin | 74/243 R |
| 2,458,441 | 1/1949 | Starkey | 192/8 C |
| 2,938,404 | 5/1960 | Tatum et al. | 74/501 |
| 3,039,420 | 6/1962 | Bevis et al. | 192/8 C |
| 3,208,300 | 9/1965 | Morse | 74/480 B |
| 3,422,784 | 1/1969 | Becker | 192/8 C X |
| 2,551,821 | 5/1951 | Benstson | 74/245 R X |

Primary Examiner—Allan D. Herrmann
Attorney, Agent, or Firm—Donnelly, Maky, Renner & Otto

[57] ABSTRACT

Steering system includes a single push-pull element which is moved linearly in either direction by rotation of a drive element to provide either a pushing or pulling force at the output. Releasable brake elements restrain the drive element against rotation in either direction when external forces are applied to the output thereby preventing undesirable movements at the output. However, the operator is free to rotate the drive element by turning an input shaft which releases the brake elements during rotation thereof.

17 Claims, 7 Drawing Figures

PATENTED MAR 12 1974 3,796,292

STEERING SYSTEM

BACKGROUND OF THE INVENTION

This invention relates generally as indicated to an improved steering system of relatively low-cost construction which provides for safer, more effective control of the steering movements of an inboard/outboard, rudder, or outboard motor of a boat.

The steering system of the present invention is a mechanical system which converts rotary motion of a drive element to linear motion for actuation of the tiller or motor of a boat or other device. Most prior existing steering systems of this general type require the use of two separate chains or cables extending between the drive element and output to provide the necessary turning force for turning the boat in opposite directions, which not only adds to the overall cost and complexity of this system, but also to the cost of installing this system. Insofar as known, such prior existing steering systems also do not provide any protection against movement in response to high external forces acting on the output, which may result in an inadvertent change in direction and temporary loss of control of the boat.

SUMMARY OF THE INVENTION

With the foregoing in mind, it is a principal object of this invention to provide a steering system of relatively simple, low-cost construction including a single push-pull element for transmitting force between a drive element and output.

Another object is to provide such a steering system which maintains positive control over the output at all times.

Still another object is to provide such a steering system which restrains movement at the output except when the operator applies an input force to the drive element thereby preventing undesirable movements caused by external applied forces to the output.

These and other objects of the present invention may be achieved by providing the steering system with a single push-pull element which is moved linearly in either direction by rotation of a drive element to provide either a pushing or pulling force at the output. The push-pull element desirably comprises a length of chain driven by a sprocket and received in a track or guideway which prevents the chain from buckling during pushing for use in compression to push a sheathed or the like connected to the tiller or other output device.

The sprocket or other drive element is normally restrained against rotation in either direction by releasable brake elements which desirably consist of a pair of coil springs surrounding the sprocket hub with their ends respectively connected to the sprocket hub and an input shaft. The springs are reversed, whereby when input is being applied to the drive element through the input shaft, the springs expand into frictional engagement with the surrounding wall of the housing for the mechanism, thereby restraining the sprocket and thus the output against movement even though high external forces may be applied to the output tending to turn the sprocket. However, rotation of the input shaft will cause rotation of the sprocket due to a lost-motion connection between the input shaft and sprocket which permits 2 to 4° of rotational movement of the input shaft before driving engagement is established with the input shaft, which is sufficient to wind one of the springs so that it no longer frictionally engages the housing, and the other spring is wound during rotation of the sprocket.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DESCRIPTION OF THE PREFERRED EMBODIMENT

Figures 1, 2, 3:
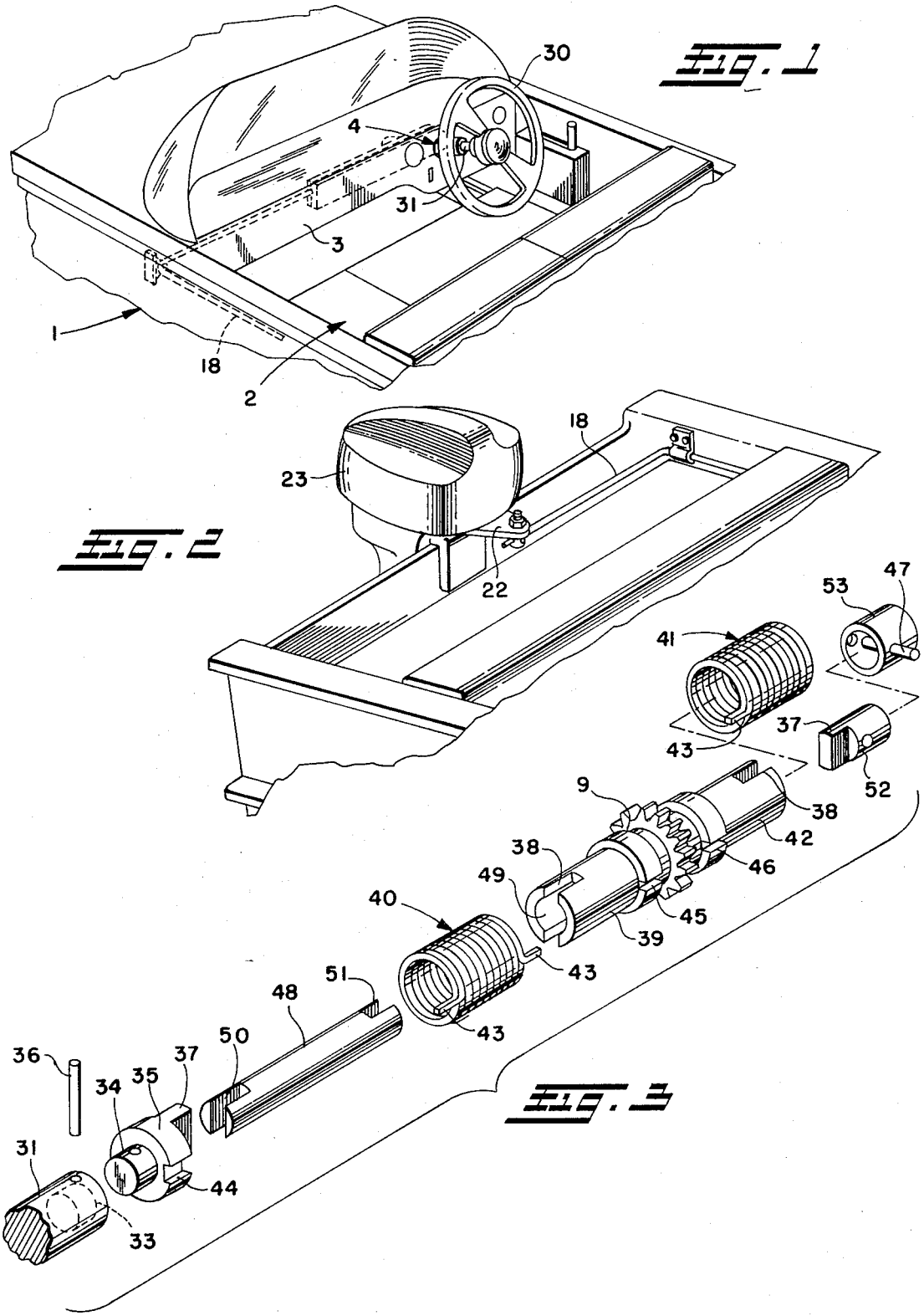
FIG. 1 is a fragmentary perspective view of a portion of a motor boat having mounted on the dashboard thereof a preferred form of steering system constructed in accordance with this invention.
FIG. 2 is a fragmentary perspective view of the stern of the boat showing one type of connection between the steering system of FIG. 1 and a motor mounted at the stern of the boat.
FIG. 3 is an enlarged exploded perspective view showing the various driving parts of the steering system of the present invention in disassembled form.

Referring in detail to the drawing and initially to FIG. 1 thereof, there is schematically illustrated a portion of a power boat 1 having a seating compartment 2 and dash panel 3 on which is mounted a preferred form of steering system 4 constructed in accordance with this invention.

Figure 4:
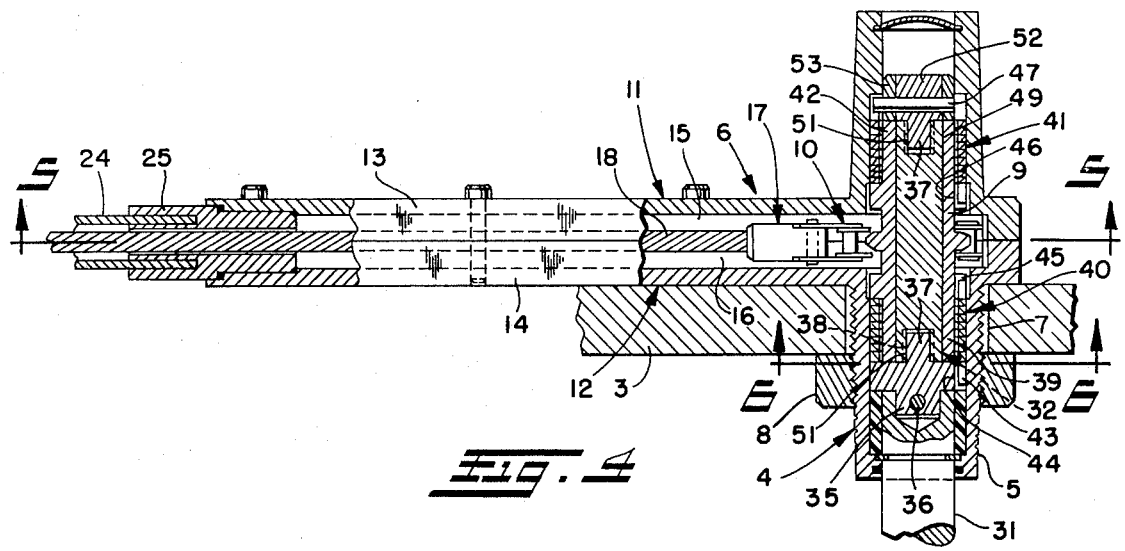
FIG. 4 is an enlarged fragmentary longitudinal section through the steering system and dashboard of FIG. 1.
Figure 5:
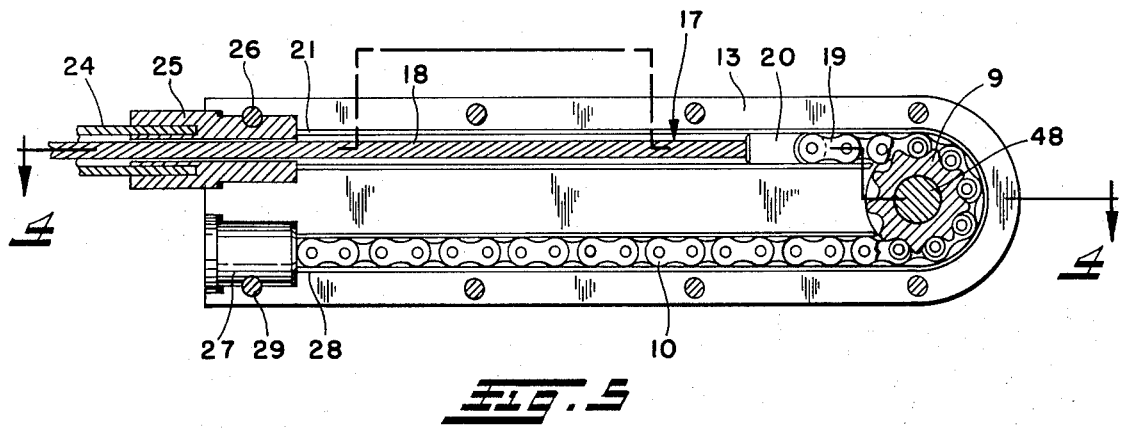
FIG. 5 is a transverse section through the drive sprocket and cable-chain housing of the steering system of FIG. 4, taken on the plane of the line 5—5 thereof.

As best seen in FIG. 4, the major portion of the steering system 4 may be concealed behind the dash panel or other suitable mounting support 3, with only a small diameter cylindrical portion 5 of the housing 6 for the steering system extending through an opening 7 in the mounting support for attachment thereto as by means of a nut 8 threaded onto the outwardly projecting portion of the cylindrical housing portion 5. Suitably mounted within the housing 6 is a drive element 9 preferably in the form of a hollow dual-hubbed sprocket engaged by a length of chain 10. The housing 6 is desirably made in two parts 11 and 12 and each part includes a transversely extending portion 13 and 14 containing a groove or slot 15 and 16 which cooperate when the two housing parts are assembled as shown in FIGS. 4 and 5 to provide a guideway or track 17 for the chain. The track 17 is of generally U-shape and extends around the sprocket 9 for maintaining the chain in engagement with the sprocket and confining the movement of the chain in all directions other than push or pull so that a pushing force may be exerted by the chain as well as a pulling force without the chain to buckle.

A conventional push-pull sheathed cable 18 is connected to one end 19 of the chain 9 as by means of a suitable connector 20 and extends from one end 21 of the generally U-shaped guideway 17 along one side of the boat back to the stern of the boat where it may also be connected to the tiller handle 22 of the motor 23 or rudder of the boat as schematically illustrated in FIGS. 1 and 2. As apparent, rotation of the sprocket 9 in opposite directions will apply either a pushing or pulling force to the chain 10 and cable 18 connected thereto for moving the motor in opposite directions. Of course, the length of the guideway or track 17 should be sufficient to accommodate a chain 10 of adequate length to obtain the maximum desired movements at the output in both directions. The sheath 24 of the cable 18 may be connected to the assembled housing parts 13, 14 containing the track 17 by a cable adaptor 25 received in one end 21 of the track and retained in place as by means of a cap screw 26 or the like. The cable adaptor 25 will also act as a stop preventing removal of the chain from one end of the track, and a cap 27 may also be inserted into the other end 28 of the track or guideway and retained in place as by means of a cap screw 29 to act as a stop preventing removal of the chain from the other end of the track as well.

Figure 6:
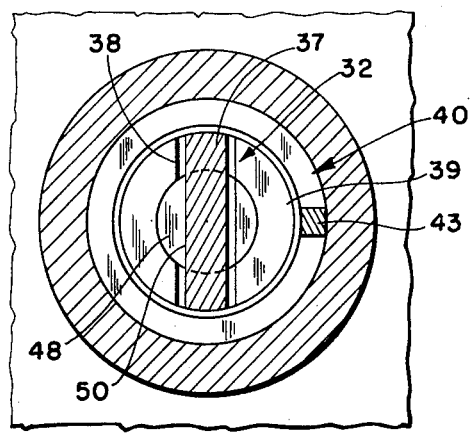
FIG. 6 is an enlarged transverse section through the steering system of FIG. 4, taken on the plane of the line 6—6 thereof to show the lost-motion drive connection between the input shaft and sprocket where there is no input to the input shaft.
Figure 7:
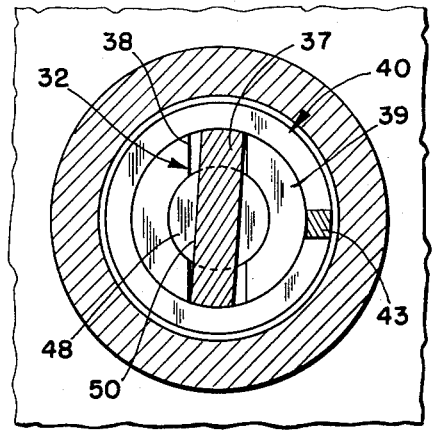
FIG. 7 is an enlarged transverse section similar to FIG. 6 but showing the relative positions of the same parts when an input is applied through the input shaft.

Rotation of the sprocket 9 is obtained by rotating the steering wheel 30 shown in FIG. 1 mounted on the main steering or input shaft 31 which desirably has a lost-motion connection 32 with the sprocket drive element 9 for a purpose to be subsequently described. As best seen in FIGS. 3 and 4, the inner end of the main input shaft 31 has a central recess 33 therein for receipt of a reduced diameter portion 34 on a drive dog 35 which is pinned to the main input shaft 31 by a dowel pin 36 extending through aligned openings in the main shaft and reduced diameter portion. On the outboard end of the drive dog 35 is a narrow tooth or flange 37 which is adapted to be received in a longitudinal slot 38 in the adjacent end of the outboard sprocket hub 39. As best illustrated in FIGS. 6 and 7, the slot 38 in the sprocket hub 39 is slightly wider than the tooth or flange 37 on the drive dog 35, desirably sufficient to allow approximately 2 to 4° of rotational movement of the main input shaft 3 prior to engaging the sprocket hub for a purpose to be subsequently described.

The sprocket drive element 9 is normally restrained against rotation in either direction by releasable brake elements desirably consisting of a pair of coil springs 40, 41 which may be disposed around the same sprocket hub or around both sprocket hubs 39 and 42 and frictionally engage the wall of the housing as shown in FIGS. 3 and 4. The ends of the coil springs 40, 41 have projecting tangs 43 thereon, and the coil spring 40 surrounding the outboard sprocket hub 39 has one of its ends received in a peripheral slot 44 in the drive dog 35 and the other end received in a slot 45 in the sprocket hub. The other coil spring 41 surrounding the outboard sprocket hub 42 also has one of its ends received in a slot 46 in the associated sprocket hub, and the other end of the coil spring is engaged by a drive dowel 47 which is driven by the main steering shaft 31 through a transfer shaft 48 freely rotatable within a longitudinal bore 49 extending through the sprocket 9. The ends of the transfer shaft are slotted at 50 and 51 for engagement by the drive dog 35 in the inboard end thereof and another drive dog 52 in the outboard end. The drive dog 52 is in turn pinned to a transfer shaft adaptor 53 by the drive dowel 47 previously described.

When a turning force is applied to the main steering or input shaft 31, the main steering shaft will initially rotate relative to the sprocket drive element 9 because of the size of the slots 38 in the ends of the sprocket hubs 39, 42 which are wide enough to allow approximately 2 to 4° of rotational movement of the main steering shaft without engaging the sprocket hubs. When the main steering shaft 31 is rotated in a clockwise direction as viewed in FIGS. 4, 6 and 7, the initial relative movement of the main steering shaft is sufficient to wind the coil spring 40 to a slightly smaller diameter which disengages the coil spring from the wall of the housing part 5 as shown in FIG. 7 to permit turning of the sprocket 9 by the main steering shaft.

During such initial clockwise rotational movement of the main steering shaft 31, the drive dowel 47 at the outboard end of the sprocket is also driven because of the close fit of the teeth 37 on the drive dogs 35, 52 in the slots 50, 51 in the ends of the transfer shaft, but in a direction away from the tang 43 on the end of the other coil spring 41, whereby the other coil-spring continues to frictionally engage the wall of the housing part. However, because the coil springs 40, 41 are reversed, when the main steering shaft 31 engages the sprocket 9 through the drive dog 35 after release of the one coil spring 40, continued rotation of the main steering shaft in the same direction will cause the sprocket 9 to rotate in a direction winding the other coil spring 41 and thus such other coil spring will not interfere with the rotation of the sprocket in a clockwise direction.

Rotation of the main steering shaft 31 in the reverse direction will have the reverse effect. That is, the other coil spring 41 will be wound during the initial rotation of the main steering shaft and drive dowel 47 connected thereto to release the sprocket 9 for rotation in a counterclockwise direction tending to wind the one coil spring 40.

From the foregoing, it will now be apparent that the steering system of the present invention provides for direct positive control of the output using a single push-pull element, and when no input is being applied to the steering system through the main steering shaft, the steering system is locked preventing inadvertent or undesirable movement of the output even though acted upon by a relatively high external force tending to rotate the sprocket in either direction. The entire assembly is also relatively compact and inexpensive, and may readily be mounted behind the dash panel of a small boat and secured in place by a single nut threaded onto the housing.

The embodiments of the invention in which an exclusive property or privilege is claimed are defined as follows:

1. A steering system comprising a sprocket drive element, means for rotating said sprocket drive element, a chain engaging said sprocket drive element whereby rotation of said sprocket drive element causes linear movement of said chain, and a housing containing a guideway for said chain which confines the movement of said chain in all directions other than push or pull so that both a pushing force and a pulling force may be applied by said chain, said sprocket drive element being contained within a relatively small diameter cylindrical housing portion adapted to extend through an opening in a mounting support, and a nut threaded onto said cylindrical housing portion extending through such opening for clamping said cylindrical housing portion to such mounting support.

2. The steering system of claim 1 wherein said housing consists of two parts each containing a groove which cooperate to define said guideway.

3. The steering system of claim 1 wherein a portion of said housing also contains said sprocket drive element.

4. The steering system of claim 1 wherein said guideway is of a generally U-shape and is open at one end for connection of a sheathed cable to one end of said chain.

5. The steering system of claim 1 further comprising releasable brake means for restraining said sprocket drive element against rotation when an external force is applied to said chain.

6. The steering system of claim 5 wherein said means for rotating said sprocket drive element comprises an input shaft connected to said sprocket drive element, and means for releasing said releasable brake means during rotation of said input shaft.

7. A steering system comprising a sprocket drive element, means for rotating said sprocket drive element, a chain engaging said sprocket drive element whereby rotation of said sprocket drive element causes linear movement of said chain, and a housing containing a guideway for said chain which confines the movement of said chain in all directions other than push or pull so that both a pushing force and a pulling force may be applied by said chain, and a cable adaptor received in said one end of said guideway for connecting the sheath of said cable to said housing, said cable connector also acting as a stop preventing removal of said chain from said one end of said guideway.

8. The steering system of claim 7 wherein the other end of said guideway is also open and contains a cap which acts as a stop preventing removal of said chain from said other end of said guideway.

9. A steering system comprising a sprocket drive element, means for rotating said sprocket drive element, a chain engaging said sprocket drive element whereby rotation of said sprocket drive element causes linear movement of said chain, and a housing containing a guideway for said chain which confines the movement of said chain in all directions other than push or pull so that both a pushing force and a pulling force may be applied by said chain, and a releasable brake means for restraining said sprocket drive element against rotation when an external force is applied to said chain, said means for rotating said sprocket drive element comprising an input shaft connected to said sprocket drive element, and means for releasing said releasable brake means during rotation of said input shaft, said releasable brake means comprising a pair of coil springs, said coil springs being reversed and frictionally engaging the wall of a housing surrounding said sprocket drive element, one end of said coil springs being connected to said sprocket drive element, and means for engaging the other end of one of said coil springs during rotation of said input shaft in one direction and for engaging the other end of the other of said coil springs during rotation of said input shaft in the opposite direction for winding said coil springs, the winding of one of said coil springs during rotation of said input shaft in one direction causing said one coil spring to move out of frictional engagement with the wall of said housing to release said sprocket drive element for rotation in the same direction tending to wind the other coil spring and vice versa.

10. The system of claim 9 wherein there is a lost-motion connection between said input shaft and drive element permitting sufficient rotation of said input shaft to release one or the other of said coil springs from frictional engagement with the wall of said housing prior to drivingly engaging said drive element.

11. The system of claim 10 wherein said lost-motion connection comprises a slot in one end of said drive element which receives a flange on said input shaft, said slot being sufficiently wider than said flange to permit the desired relative movement between said input shaft and drive element during initial rotation of said input shaft.

12. The system of claim 11 wherein the width of said slot is sufficient to permit approximately 2 to 4° of rotation of said input shaft prior to drivingly engaging said drive element.

13. A system comprising a housing containing a drive element, means for rotating said drive element within said housing, an output member, means for converting rotational movement of said drive element to linear movement of said output member, and a releasable brake means for restraining said drive element against rotation when an external force is applied to said output member, said means for rotating said drive element comprising an input shaft connected to said drive element, and means for releasing said releasable brake means during rotation of said input shaft, said releasable brake means comprising a pair of coil springs, said coil springs being reversed and frictionally engaging the wall of a housing surrounding said drive element, one end of said coil springs being connected to said drive element, and means for engaging the other end of one of said coil springs during rotation of said input shaft in one direction and for engaging the other end of the other of said coil springs during rotation of said input shaft in the opposite direction for winding said coil springs, the winding of one of said coil springs during rotation of said input shaft in one direction causing said one coil spring to move out of frictional engagement with the wall of said housing to release said drive element for rotation in the same direction tending to wind the other coil spring and vice versa, and a lost-motion connection between said input shaft and drive element permitting sufficient rotation of said input shaft to release one or the other of said coil springs from frictional engagement with the wall of said housing prior to drivingly engaging said drive element, said lost-motion connection comprising a slot in one end of said drive element which receives a flange on said input shaft, said slot being sufficiently wider than said flange to permit the desired relative movement between said input shaft and drive element during initial rotation of said input shaft, said drive element having a pair of oppositely extending hub portions surrounded by said coil springs and a longitudinal bore therethrough, a transfer shaft freely rotatable in said longitudinal bore, means for rotating said transfer shaft with said input shaft, and means driven by said transfer shaft for winding the coil spring remote from said input shaft during rotation of said input shaft in one direction.

14. The system of claim 13 wherein said means for rotating said transfer shaft comprises a slot in one end of said transfer shaft which closely receives said flange on said input shaft.

15. The system of claim 14 wherein said means for winding the coil spring remote from said input shaft comprises a drive dog having a flange thereon closely received in a slot in the other end of said transfer shaft, and a drive dowel extending through said drive dog for engaging one end of said last-mentioned coil spring during rotation of said input shaft in one direction.

16. The system of claim 15 further comprising a transfer shaft adaptor pinned to said drive dog by said drive dowel.

17. A system comprising a housing containing a drive element, means for rotating said drive element within said housing, an output member, means for converting rotational movement of said drive element to linear movement of said output member, and a releasable brake means for restraining said drive element against rotation whan an external force is applied to said output member, said means for rotating said drive element comprising an input shaft connected to said drive element, and means for releasing said releasable brake means during rotation of said input shaft, said releasable brake means comprising a pair of coil springs, said coil springs being reversed and frictionally engaging the wall of a housing surrounding said drive element, one end of said coil springs being connected to said drive element, and means for engaging the other end of one of said coil springs during rotation of said input shaft in one direction and for engaging the other end of the other of said coil springs during rotation of said input shaft in the opposite direction for winding said coil springs, the winding of one of said coil springs during rotation of said input shaft in one direction causing said one coil spring to move out of frictional engagement with the wall of said housing to release said drive element for rotation in the same direction tending to wind the other coil spring and vice versa, and a lost-motion connection between said input shaft and drive element permitting sufficient rotation of said input shaft to release one or the other of said coil springs from frictional engagement with the wall of said housing prior to drivingly engaging said drive element, said lost-motion connection comprising a slot in one end of said drive element which receives a flange on said input shaft, said slot being sufficiently wider than said flange to permit the desired relative movement between said input shaft and drive element during initial rotation of said input shaft, and a drive dog pinned to the inner end of said input shaft, said drive dog having said flange thereon.

* * * * *